(No Model.)
E. P. MONROE & J. A. OSGOOD.
VALVE STEM SUPPORT.
No. 245,968. Patented Aug. 23, 1881.
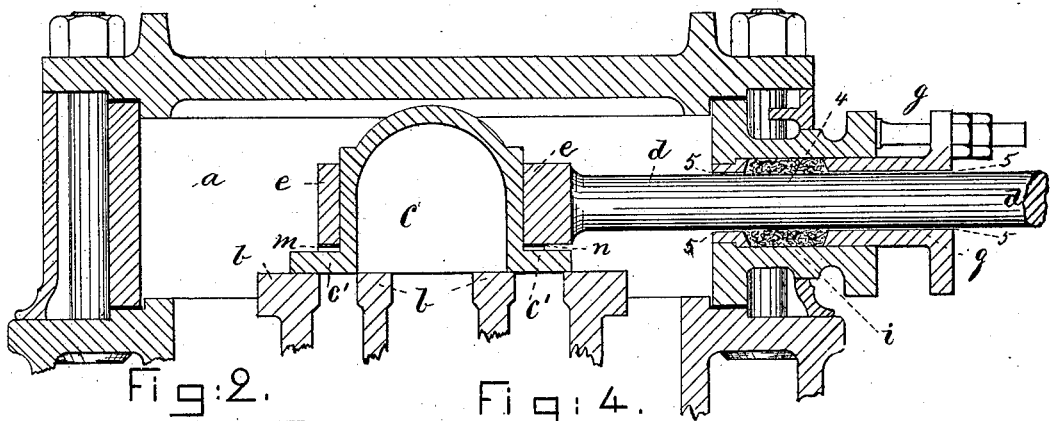
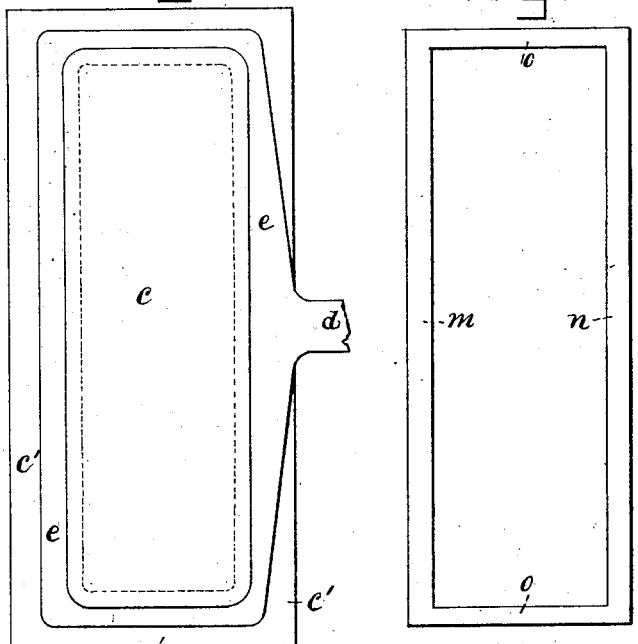
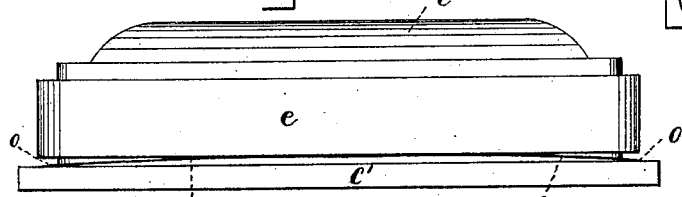
WITNESSES
L. F. Connor.
Arthur Reynolds.
INVENTOR
Edwin P. Monroe &
Josiah A. Osgood,
by Crosby Gregory. Att'ys

UNITED STATES PATENT OFFICE.

EDWIN P. MONROE, OF NEW YORK, N. Y., AND JOSIAH A. OSGOOD, OF GRANTVILLE, MASSACHUSETTS, ASSIGNORS TO THE UNITED STATES METALLIC PACKING COMPANY, OF BOSTON, MASSACHUSETTS.

VALVE-STEM SUPPORT.

SPECIFICATION forming part of Letters Patent No. 245,968, dated August 23, 1881.

Application filed March 5, 1881. (No model.)

*To all whom it may concern:*

Be it known that we, EDWIN P. MONROE, of the city, county, and State of New York, and JOSIAH A. OSGOOD, of Grantville, Norfolk county, State of Massachusetts, have invented a new and useful Improvement in Valve-Stem Supports, of which the following description, in connection with the accompanying drawings, is a specification.

Our invention relates to a valve-stem support for steam-engines, and has for its object to relieve the stuffing-boxes or other bearing of the valve-stem, where it enters the steam-chest, of the burden of sustaining the weight of the said stem, and to thus prevent the wear of the parts involved thereby.

In steam-engines as commonly constructed, using the ordinary D slide-valve, the valve-stem is not positively connected with the valve, but usually terminates in a yoke or bridle, which embraces the said valve, to cause it to accompany the said valve-stem in its movements relative to the valve-seat and parallel therewith, but permits an independent movement of the valve at right angles to its seat, so that it will always be brought to a close bearing thereon by its weight or the pressure of the steam without bringing any strain upon the valve-stem as the face of the valve and its seat wear away. By this arrangement the valve and its seat afford no support for the valve-stem and its yoke, the weight of which is wholly sustained upon the bearing or packing through which it enters the steam-chest.

Our invention consists in interposing between the valve and the yoke or bridle of the valve-stem an elliptical spring, which is shown as resting upon the outer flange of the valve at its extremities and bearing upon it at its middle or curved portion the yoke or bridle of the valve-stem, the weight of which is thus supported, primarily, upon the said spring, and, secondarily, upon the valve and its seat, so that the bearing or packed passage through which it enters the steam-chest is thus relieved of its weight and the consequent friction and wear due thereto. The valve-stem supported in this way still permits the independent movement of the valve in a direction at right angles to its seat, upon which it is pressed, with the additional weight of the valve-stem transmitted through the said spring.

We prefer in practice to so adjust the spring that its force is somewhat more than the weight of the valve-stem when the latter is resting in its normal position upon it, so that when the engine is first constructed the valve-stem will have a slight upward pressure upon its bearing in the end of the steam-chest, and thus as the valve wears away it will relieve the said spring until it first just balances the valve-stem, and, finally, no longer wholly balances it, but allows it to bear with a portion of its weight upon the lower side of its bearing in the steam-chest. By this plan the wear will be distributed over the upper and under sides of the bearing of the valve-stem, instead of being confined wholly to the under side, as it would be if the spring just balanced the weight of the said stem before the valve had begun to wear away.

The shape of the spring employed will vary somewhat, according to the construction of the steam-chest and inclosed parts. When the valve-stem is provided with a yoke which surrounds the exhaust-chamber or hollow portion of the valve the spring will preferably be formed as a rectangular frame of suitable size to just pass over the said chamber and rest upon the flanges thereof. The said frame is crossed, so that one pair of parallel sides form two elliptical springs, the function of the other two sides being merely to retain the spring-sides in proper position. When the steam-chest is too narrow to permit a yoke to be used upon the valve-stem, or when for other reasons the construction known as a "bridle" is employed, two independent springs may be employed, they being fastened to the said bridle by bolts, or otherwise secured in proper position between the valve and bridle.

Figure 1 is a sectional view of a steam-chest containing a valve and valve-stem provided with our invention; Fig. 2, a top view of the valve and the end of the valve-stem and its connected yoke detached; Fig. 3, a rear elevation thereof; Fig. 4, a plan view of the supporting-springs detached; Fig. 5, a plan and side elevation of a modified form of spring adapted to be used with a bridle connection, and Fig. 6 a plan view of a valve and valve-stem connected therewith by a bridle instead of a yoke.

The steam-chest $a$, valve-seat $b$ therein, slide-valve $c\ c'$, and valve-stem $d$, with its connecting-yoke $e$, may be of any usual construction, the said yoke permitting an independent vertical movement of the valve $c$ toward its seat $b$, and the said valve of itself providing no support for the weight of the valve-stem and yoke.

In order to relieve the bearing $g$ (shown in this instance as an ordinary stuffing-box with fibrous packing $i$) of the weight of the said valve-stem $d$ and yoke $e$, which would otherwise be borne thereon, two supporting-springs, $m\ n$, are interposed between the flange portion $c'$ of the valve and the yoke $e$, which thus rests upon the said springs, by means of which its weight is sustained ultimately upon the valve-seat $b$, instead of on the bearing $g\ i$, without, however, interfering with the independent movement of the valve $c\ c'$ in the yoke $e$, so that the said valve is free to adjust itself in the usual manner to its seat without bringing any strain upon the valve-stem or its bearing.

In the form shown in Fig. 4 the springs $m\ n$ are connected by cross-pieces $o\ o'$ at their extremities, with which they form a rectangular frame of proper size to just fit over the exhaust-chamber $c$ of the valve, as shown in Figs. 1 and 3, so that the said springs are retained in place without any fastening.

In some instances, owing to the design of the engine, there will not be sufficient room for the connecting-pieces $o$ at the ends of the valve-chamber $c$, and in such instances the well-known bridle construction illustrated in Fig. 6 is usually employed, instead of the yoke $e$, to connect the valve-stem $d$ with the valve. In such instances the springs $m\ n$ may be of the form shown in Fig. 5, they being provided with a bolt-hole, 2, or other means to enable them to be readily fastened to the under side of the yoke or bridle; or they may be forked or slotted at their ends, as shown at 3, to embrace suitable studs on the flange portion $c'$ of the valve.

The springs $m\ n$ will preferably be of such curvature and stiffness that when first put in place, as shown in Fig. 1, before the face of the valve and its seat are worn away, the said springs will exert a pressure on the yoke $e$ more than sufficient to balance its weight, so that the valve-stem will have a slight upward pressure on the packing $i$, and the tendency to wear will be greater at the upper side, 4, of the valve-stem than at the under side thereof; but as the valve and its seat wear away the said valve will drop relative to the yoke $e$, and thus relieve the spring, until finally it fails to wholly sustain the weight of the valve-stem, which will then bear more forcibly on its under than on its upper side. The passage in the hard-metal bushing through which the valve-stem enters the steam-chest is preferably made of slightly-greater vertical than horizontal diameter, so that a slight space is left at the upper and under sides of the valve-stem $d$, as shown at 5, and the said stem is thus relieved, as far as possible, of wear at its upper and lower sides, such construction being rendered possible by the employment of the rod-support.

It will be seen that an elliptical spring, such as herein shown, can be used in the narrow space between the valve and yoke or bridle, to support the latter at just the proper height, while if it were attempted to use spiral springs acting longitudinally across the said narrow space it would be impossible to obtain a uniform distribution of the pressure, or to retain the said pressure sufficiently nearly uniform in total amount for any length of time, and we do not broadly claim a spring or elastic support interposed between the valve and its stem.

We claim—

1. The valve and valve-stem connected therewith and adapted to permit independent movement of the valve to and from its seat, combined with the elliptical springs $m\ n$, adapted to be held in place between the said valve and valve-stem, as described, whereby the said valve-stem is supported and its packed bearing relieved of its weight, substantially as and for the purpose set forth.

2. The elliptical springs $m\ n$, combined with the connecting-pieces $o$, forming therewith a rectangular frame, adapted to fit over the exhaust-chamber of a valve and be held in proper position, thereby to provide a support for the valve-stem, substantially as and for the purpose described.

In testimony whereof we have signed our names to this specification in the presence of two subscribing witnesses.

EDWIN P. MONROE.
JOSIAH A. OSGOOD.

Witnesses:
G. W. GREGORY,
JOS. P. LIVERMORE.